United States Patent
Hüning et al.

(10) Patent No.: US 9,662,765 B2
(45) Date of Patent: May 30, 2017

(54) DEVICE AND METHOD FOR ELECTROMECHANICALLY-ASSISTED ROLLER BURNISHING

(71) Applicants: Fraunhofer-Gesellschaft zur Förderung der angewandten Forschung e.V., München (DE); Technische Universität Berlin, Berlin (DE)

(72) Inventors: Holger Hüning, Berlin (DE); Jens König, Berlin (DE); Eckart Uhlmann, Kiebitzreihe (DE); Christoph König, Berlin (DE)

(73) Assignees: Fraunhofer-Gesellschaft zur Förderung der angewandten Forschung e.V., München (DE); Technische Universität Berlin, Berlin (DE)

( * ) Notice: Subject to any disclaimer, the term of this patent is extended or adjusted under 35 U.S.C. 154(b) by 206 days.

(21) Appl. No.: 14/387,471

(22) PCT Filed: Mar. 25, 2013

(86) PCT No.: PCT/EP2013/056316
§ 371 (c)(1),
(2) Date: Sep. 23, 2014

(87) PCT Pub. No.: WO2013/139998
PCT Pub. Date: Sep. 26, 2013

(65) Prior Publication Data
US 2015/0047162 A1    Feb. 19, 2015

(30) Foreign Application Priority Data
Mar. 23, 2012   (DE) .................. 10 2012 006 471

(51) Int. Cl.
*B24B 39/06* (2006.01)
*B24B 39/00* (2006.01)
(Continued)

(52) U.S. Cl.
CPC ............... *B24B 39/06* (2013.01); *B23P 9/02* (2013.01); *B24B 1/002* (2013.01); *B24B 39/00* (2013.01);
(Continued)

(58) Field of Classification Search
CPC ......... B23B 11/00; B24B 1/002; B24B 39/00; B24B 39/003; B24B 39/02–39/023;
(Continued)

(56) References Cited

U.S. PATENT DOCUMENTS 3,360,630 A * 12/1967 Blaszkowski ............ C21D 1/09
148/566
3,442,784 A *  5/1969 Wieck ...................... B23H 5/06
204/217
(Continued)

FOREIGN PATENT DOCUMENTS

DE            3142270        5/1983
DE    10 2004 058 146        6/2006
(Continued)

OTHER PUBLICATIONS

International Application No. PCT/EP2013/056316, International Preliminary Report on Patentability mailed Oct. 2, 2014, 10 pgs.
(Continued)

*Primary Examiner* — Christopher Besler
*Assistant Examiner* — Matthew P Travers
(74) *Attorney, Agent, or Firm* — Schwegman Lundberg & Woessner, P.A.

(57) ABSTRACT

A device for electromechanically assisted roller burnishing (EMRB) may comprise: a roller burnishing tool with exactly
(Continued)

one current-leading roller burnishing element for burnishing a workpiece, wherein the roller burnishing element represents a first electrical contact element for electrically contacting first location of the workpiece, and a second electrical contact element for electrically contacting second location of the workpiece; wherein the first and the second electrical contact elements can be positioned at a settable spatial distance to one another, so that on moving the roller burnishing element on the workpiece, a current path in the workpiece between the first and the second contact elements is always a constant length.

10 Claims, 3 Drawing Sheets

(51) Int. Cl.
*B24B 1/00* (2006.01)
*B23P 9/02* (2006.01)
*B24B 49/14* (2006.01)
*C21D 7/08* (2006.01)
*C21D 7/04* (2006.01)

(52) U.S. Cl.
CPC ............ *B24B 39/003* (2013.01); *B24B 49/14* (2013.01); *C21D 7/04* (2013.01); *C21D 7/08* (2013.01); *Y10T 29/47* (2015.01)

(58) Field of Classification Search
CPC ........ B24B 39/04–39/045; B24B 39/06; B23P 9/02; C21D 7/08; Y10T 29/47; Y10T 29/476
See application file for complete search history.

(56) References Cited

U.S. PATENT DOCUMENTS

| | | | |
|---|---|---|---|
| 4,561,214 A * | 12/1985 | Inoue | A61C 3/06 15/104.14 |
| 2005/0155203 A1* | 7/2005 | Prevey | B23P 9/02 29/90.01 |
| 2007/0220727 A1* | 9/2007 | Cheatham | B24B 39/00 29/90.01 |
| 2009/0277541 A1 | 11/2009 | Bamberg | |
| 2010/0196737 A1* | 8/2010 | Dugas | G11B 5/8404 428/800 |

FOREIGN PATENT DOCUMENTS

| | | | |
|---|---|---|---|
| DE | 10 2005 041 250 | 3/2007 | |
| RU | 2030982 C1 * | 3/1995 | ............ B24B 39/00 |
| WO | WO-2013/139998 | 9/2013 | |

OTHER PUBLICATIONS

"International Application No. PCT/EP2013/056316, International Search Report and Written Opinion mailed Jun. 19, 2013", (Jun. 19, 2013), 12 pgs.

* cited by examiner

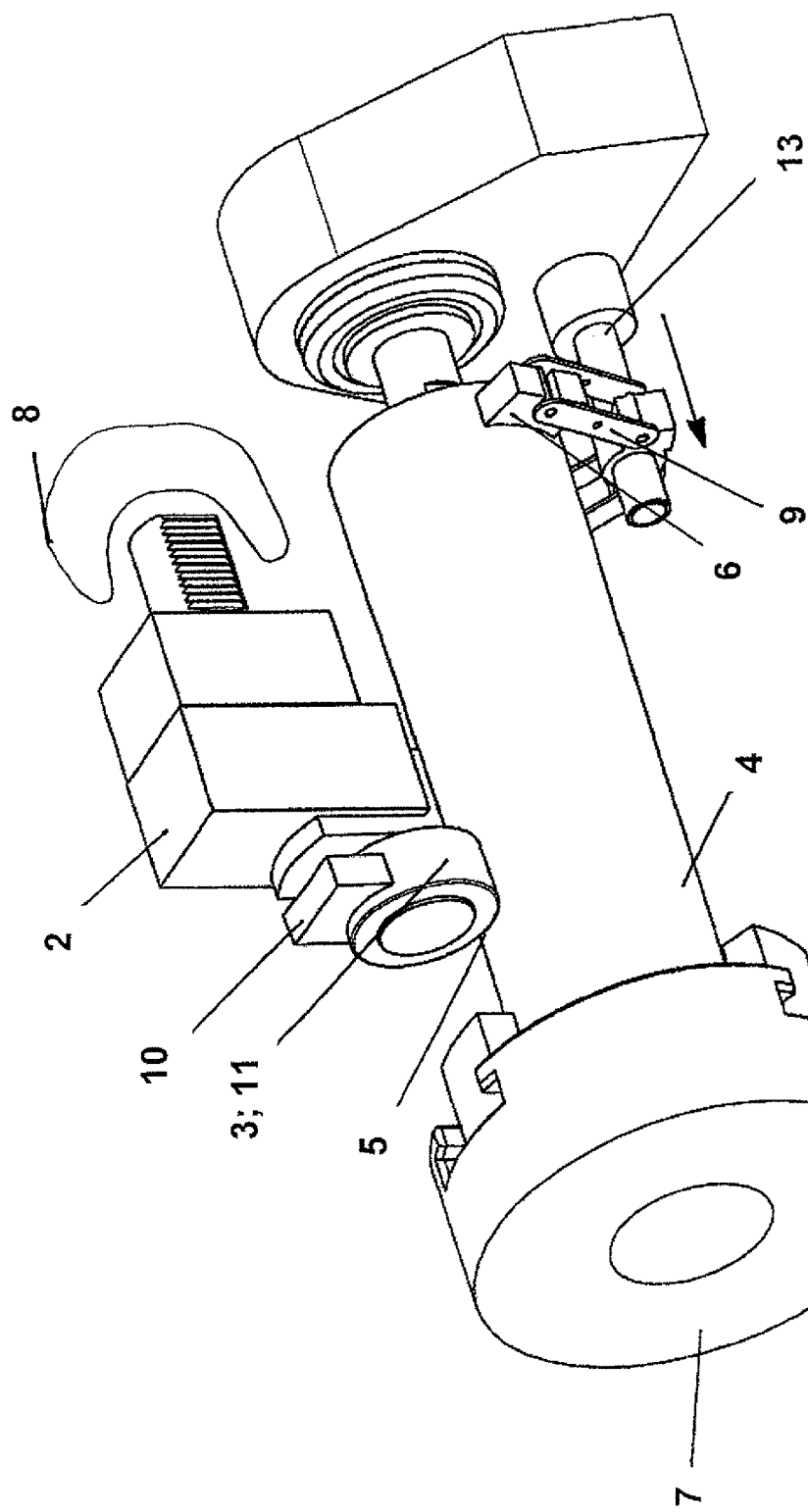

DEVICE AND METHOD FOR ELECTROMECHANICALLY-ASSISTED ROLLER BURNISHING

PRIORTY CLAIM TO RELATED APPLICATIONS

This application is a U.S. National Stage application filed under 35 U.S.C. §371 from International Application Serial No. PCT/EP2013/056316, which was filed Mar.25, 2013, and publish as WO 2013/139998 on Sep.26, 2013, and which claims priority to German Application No.10 2012 006 471.3, filed Mar.23, 2012, which application and publication are incorporated by reference as if reproduced herein and made a part hereof in their entirety, and the benefit of priority of each of which is claimed herein.

TECHNICAL FIELD

The present patent application relates to a device for the electromechanically assisted roller burnishing, as well as to a corresponding method for the electromechanically assisted roller burnishing.

BACKGROUND OF THE INVENTION

Mechanical roller burnishing as a post-machining process on turned parts already belongs to the state of the art. Roller burnishing serves mainly for improving the surface quality, either as an outer machining or as an inner machining after a previous, mostly mechanical machining Low roughness depths and higher contact ratios can be achieved by this forming process, and the material hardness can be increased on the outer surfaces.

SUMMARY

Surface roughness is smoothed on roller burnishing, by way of the material of the roughness peaks being pressed by way of one or more roller burnishing elements (in the form of rollers, disks or balls) into the troughs lying between the tool marks, and being levelled. The levelling of the surface profile is effected by way of the flow of the material into the troughs. A uniform surface level is achieved by way of the lifting of the floor which is caused by way of this. The roller burnishing elements are hardened and mostly have a high surface finish quality. Thereby are either used as rollers, disks or balls in a tool carrier.

Local increases of strength of layers close to the surface occur, depending on the relevant machining parameters of feed, depth of cut or roller force and the peripheral speed of the rotating workpiece as well as the roller geometry. Micro-notches are eliminated by way of the smoothing or burnishing of the surface. Workpieces which are machined in a material-removing manner and ductile materials are the precondition for the type of cold forming method.

One method variant is electromechanically assisted roller burnishing (EMRB), with which the surface of a round body is mechanically pressed in and strengthened, by way of several roller burnishing bodies amid a simultaneous application of heat. High temperatures at the active location are realised by way of high current strengths and low voltages directly at the contact location between the surfaces of the workpiece and the tool. Structure changes are caused by way of the heat input and the subsequent cooling, with which changes a fine-grained structure in the form of martensite with residual austenite is achieved. The result is a surface hardening.

On the one hand, the transfer of a controlled heat input via the contact location onto the machining zone, but on the other hand the material-relevant cooling time are of a problem. The contacting which is necessary for high current strengths onto the roller burnishing element is also subjected to mechanical wear.

It is therefore the object of the present invention, to provide a device and a method, with which, with a low tool wear, a best possible control of the structure change as well as a high as possible surface quality of the workpiece are achieved.

This firstly relates to a device for the electromechanically assisted roller burnishing (EMRB), wherein a roller burnishing tool with exactly one current-leading roller burnishing element is given for burnishing a workpiece, and this roller burnishing element comprises a first electrical contact element for the electrical contacting at a first location of the workpiece, and the device moreover comprises a second electrical contact element for the electrical contacting at a second location of the workpiece, wherein the first and the second electrical contact element are positionable to one another at a preferably fixedly settable spatial distance, so that a current path in the workpiece between the first and second contact element is always equally long when moving the roller burnishing element on the workpiece. "Fixedly settable" in the context of this patent application is to be understood as the limitation to conventional machine tools, e.g. lathes, with which the length of the current path would automatically change with an increasing feed, which is disadvantageous. "Fixedly" means rather that the length of the current path between the first and the second contact element remains essentially the same. This of course does not exclude any readjustments during the machining procedure, which for example could be due to wear, spring paths or also due to the component contour (see below).

Briefly stated, a current path length which remains constant is realised in the workpiece by way of the co-led (which is to say carried along or caught), current connection (the second electrical contact element). Essentially, only a single current-leading roller burnishing element is absolutely necessary, and this can serve for the required rolling force as well as for the direct current contact between the roller burnishing element and the workpiece (however also further roller burnishing tools can be given, which however should not then be provided with electrical contacts). The realisation of the electrical current flow, and thus the transmission into the machining zone, is effected between this individual roller burnishing element and the workpiece, and the current path of an equidistant length then runs to the second electrical contact element, which is contacted by the workpiece for this. It is to be understood per se, that the workpiece for this should have sufficient electrical conductive properties, and here it is particularly metals or metal alloys which are envisaged.

The invention can be applied in a special complete device for the electromagnetically assisted roller burnishing, said device comprising all components (rotation drive, chucking for a roller burnishing tool etc.).

"Machine tool" in the context of the present application is to be understood as a lathe, a machining centre or a milling machine.

However, it is also possible for the components which are important for roller burnishing to be unified into a roller burnishing tool which can be clamped or chucked into a tool receiver of a machine tool. In this manner, it is possible to inexpensively retrofit an existing machine tool into a device for carrying out the EMRB. Hereby, it is even possible to install a control and regulation device into the roller burnishing tool to be retrofitted, in order thus to be able to coordinate the decisive operating parameters (voltage/current strength/temperature and/or feed speed as well as the depth of cut and the rolling force of the machine) and thus to achieve an optimal surface finish quality or the desired structure change.

Preferably, workpiece surfaces with a high bearing surface or contact ratio by way of burnished and strengthened surfaces can be achieved with the present invention, as well as high gloss qualities. Moreover, the hardening of layers close to the surface is easily possible.

Moreover, the method according to the invention can be applied for creating sliding surfaces, sealing surfaces, joint surfaces on round or oval parts as well as for burnishing and strengthening radii, cylindrical outer diameters, cones, plane surfaces, recesses, thread undercuts and likewise on turned parts and other parts. Moreover, the forming of walls on hollow bodies, the realisation of high-quality gloss surface qualities on metallic materials and the forming of hollow bodies for realising connections of several parts are possible.

The method according to the invention definitely has the greatest advantages with relatively long turned parts, i.e. turned parts whose total length in the direction of the rotation axis on chucking into the lathe is at least 100 mm, preferably at least 150 mm.

Advantageous further developments of the present invention are described in the dependent claims.

One advantageous further development envisages the roller burnishing tool being designed for burnishing planar surfaces, free-shaped surfaces and/or rotatory surfaces, wherein these rotatory surfaces can belong to workpieces which in cross section are essentially rotationally symmetrical or oval. This means that the concept of the present invention is not limited to a rotationally symmetrical application. For example, a good surface [finish] quality can also be created on roller burnishing a plane surface by way of the co-led second electrical contact element.

A further advantageous development envisages the device comprising a first receiver for a workpiece and/or a second receiver for a tool (preferably a lathe tool receiver). This basic construction is to be found with conventional machine tools, and here an elongate component can be chucked or clamped into the workpiece receiver, and then the roller burnishing tool clamped into the lathe tool receiver.

A further advantageous development envisages the first and/or the second electrical contact element comprising a spring holder for the resilient holding of the electrical contact element on the tool, by way of which a uniform pressing pressure and a surfaced contact of the contact element on the tool is ensured at all times, and/or the first and/or the second electrical contact element being formed as a roller, brush or a component with a recess adapted to the outer contour of the workpiece. In particular hereby, it is particularly with non-round parts and/or with an initially poor surface quality that a constant flow of current is rendered possible during the machining by way of the spring mounting or the design as a brush. Moreover, the distance to the workpiece essentially remains the same, even with a wear of the component, since these resilient parts again and again adapt to the workpiece geometry. Moreover, with brushes or current-leading components which are adapted to the outer contour of the workpiece, it is advantageous that the current density can be kept low due to the relatively large contact surface, and thus electric arcs or locally unnecessarily high current intensities can be avoided, since these lead to an undesirable wear of the electrical contact or also to undesired structure changes in the workpiece.

A further advantageous development envisages the first electrical contact element itself being given by the roller burnishing element, wherein preferably the roller burnishing element comprises a roller for roller burnishing and a current transmitting element in the form of a brush and/or a component with a recess which is complementary to this roller, around the peripheral surface of the roller. Of course, it is also possible to provide two corresponding current-leading components or several brushes, in order to further increase the contact surface. The advantage of this is the fact that the introduction of current at the roller burnishing element is effected in a direct manner and thus, apart from the mechanical loading of the workpiece there, a targeted introduction of heat is also achieved for the best possible structure change. A closed-loop control of the EMRB method is particularly easily possible due to the fact that preferably the mechanical loading is only effected at this location, and the second electrical contact element which during the machining is arranged at an equidistant distance, preferably represents no additional mechanical loading. If for example two roller burnishing elements were to be provided, which both load mechanically as well as electrically, the control/regulation would be significantly more complex, since a coordination is difficultly possible or an overloading of the workpiece is probable, due to the superpositions of individual influences. (This will be discussed in more detail further below with the description of the control and regulation device).

A further advantageous development envisages the second electrical contact element being arranged on a dog (catch) of the roller burnishing tool or on an equidistantly co-led arm of the device. This means that when the second electrical contact element is fastened on a dog of the roller burnishing tool, this second electrical contact element is then a constituent of the roller burnishing tool, which thus can be inserted into the lathe tool receiver or likewise. Alternatively to this, it is also possible to provide an arm which is independent of this (for example on the lathe), wherein then a second drive is necessary as the case may be for creating the equidistance.

It is advantageous that the distance between the current-leading roller burnishing element and the second electrical contact element can be varied during the method, if different feed mechanisms are selected for the roller burnishing tool and the second electrical contact. E.g. a machine tool with two tool carriers can be used for this. Thus the distance of both contacts can be set via the machine control.

A further advantageous development envisages the device according to the invention comprising a control and regulation device for the control of electrical parameters, such as e.g. the voltage and/or the current strength of the current path running through the workpiece (thus between the first and the second electrical contact element). The control and regulation device hereby can comprise a measurement device for measuring the temperature of the workpiece surface. This can be a touch sensor or also a sensor for measuring radiation heat. Otherwise, other parameters can also be controlled and co-measured. For example, the intensity of the mechanical loading of the roller burnishing element on the workpiece is a relevant factor, also (in particular for machining turned parts) the feed speed.

It is possible to integrate the control and regulation of the roller burnishing tool into the overall control of the machine tool and/or to connect it to this machine tool via an interface. According to the invention, it is possible to design the control and regulation of the roller burnishing tool such that this is accommodated in the machine housing of the lathe or that this is integrally connected to a roller burnishing tool which for example can be incorporated into a lathe tool receiver.

Further advantageous developments are described in the remaining dependent claims.

BRIEF DESCRIPTION OF THE DRAWINGS

The invention is now explained by way of several figures. There are shown in.

DETAILED DESCRIPTION

Figure 1:
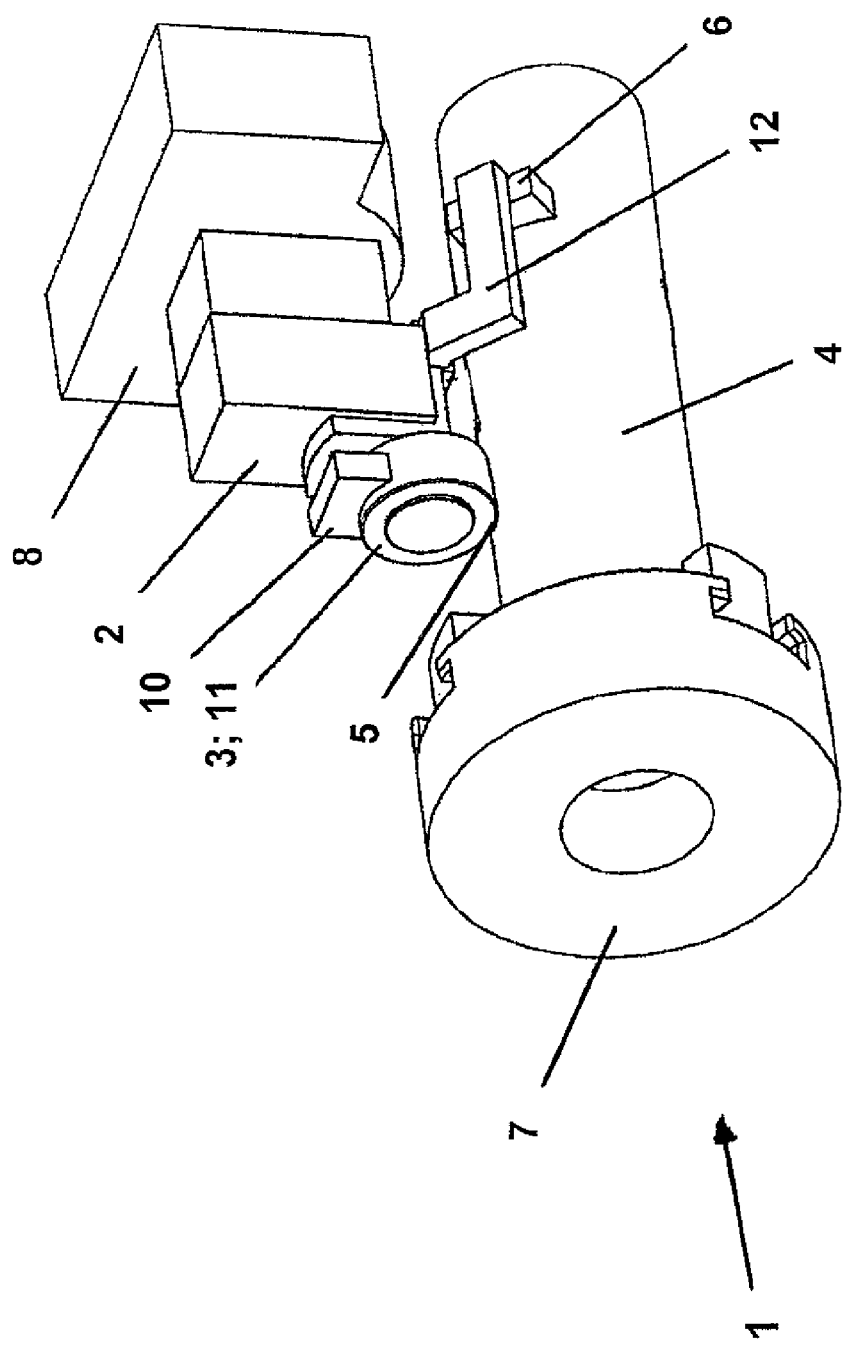
FIG. 1 a EMRB device according to the invention.

FIG. 1 shows a device according to the invention, for the electromechanically assisted roller burnishing.

The construction of the device shown in FIG. 1 is firstly that of a classical lathe or a corresponding roller burnishing device. A workpiece 4 (an elongate turned part) can be chucked into a first receiver 7. The receiver can be adjusted by way of a suitable clamping for workpieces of a different diameter, in order to anchor these in the receiver in a rotationally fixed manner and then to achieve a controlled rotational movement about the longitudinal axis of the workpiece 4.

A roller burnishing tool 2 is clamped in a second receiver, a tool receiver 8. This tool receiver is designed such that a lathe tool or likewise can also be clamped here.

The roller burnishing tool 2 is dealt with in a detailed manner hereinafter, wherein this tool can be completely (i.e. including a dog 12 and the second electrical contact element 6) retrofitted, i.e. can be clamped into the tool receiver of a known lathe. Hereby, it is even possible to integrate a control and regulation device (not shown in the picture) into the roller burnishing tool 2, said device yet able to comprise sensors for measuring the current strength and/or temperature. The roller burnishing tool 2 is movable in the longitudinal direction of the workpiece 4 (feed; this feed can also be set with a different speed) as well as at a radial distance to the workpiece 4 (the pressure of the roller burnishing element 3 on the workpiece can be closed-loop controlled by way of this). The roller burnishing element 3 rolls with its peripheral surface on the peripheral surface of the workpiece 4, and surface changes or structure changes in the workpiece occur due to this pressure application. Additionally, an influencing/heating of the workpiece in the region to be machined is additionally effected by way of electrical current, in order to assist this procedure. A current transmitting element 10 which is designed as a component whose geometry is designed complementarily to the outer periphery of the roller 11 (of the roller burnishing element 3) is provided for this. Alternatively, brushes or also rollers are possible here, and it is also possible to provide several current transmission elements. The roller 11 (the roller burnishing element 3) is electrically conductive at least at its outer periphery, so that electrical current to a first electrical contact element (i.e. the roller 11 itself, above all at the connect location to the workpiece 4) is given via the current transmission element 10. The roller burnishing tool 2 moreover has a dog 12, at whose end a second electrical contact element 6 is provided. This here has a shape which is complementary to the outer periphery of the workpiece 4. However, it would also be possible here to select a brush arrangement, and moreover what is not shown is the fact that the dog 12 is sprung such that the second electrical contact element is pressed gently onto the surface of the workpiece 4. This pressure should merely ensure that the electrical contact is given, but no structure change should be effected by way of this. However, it is not ruled out that a second roller burnishing element is provided, but this however should then not also be current-leading, since this could render the closed-loop control of the EMRB procedure more difficult.

It is thus ensured by way of the dog 12 which is fixedly attached on the roller burnishing tool 2, that the distance in the longitudinal direction of the workpiece, said distance existing between the first electrical contact element 5 and the second electrical contact element 6, is always the same, independently of the feed of the tool receiver or of the roller burnishing tool 2.

Figure 2:
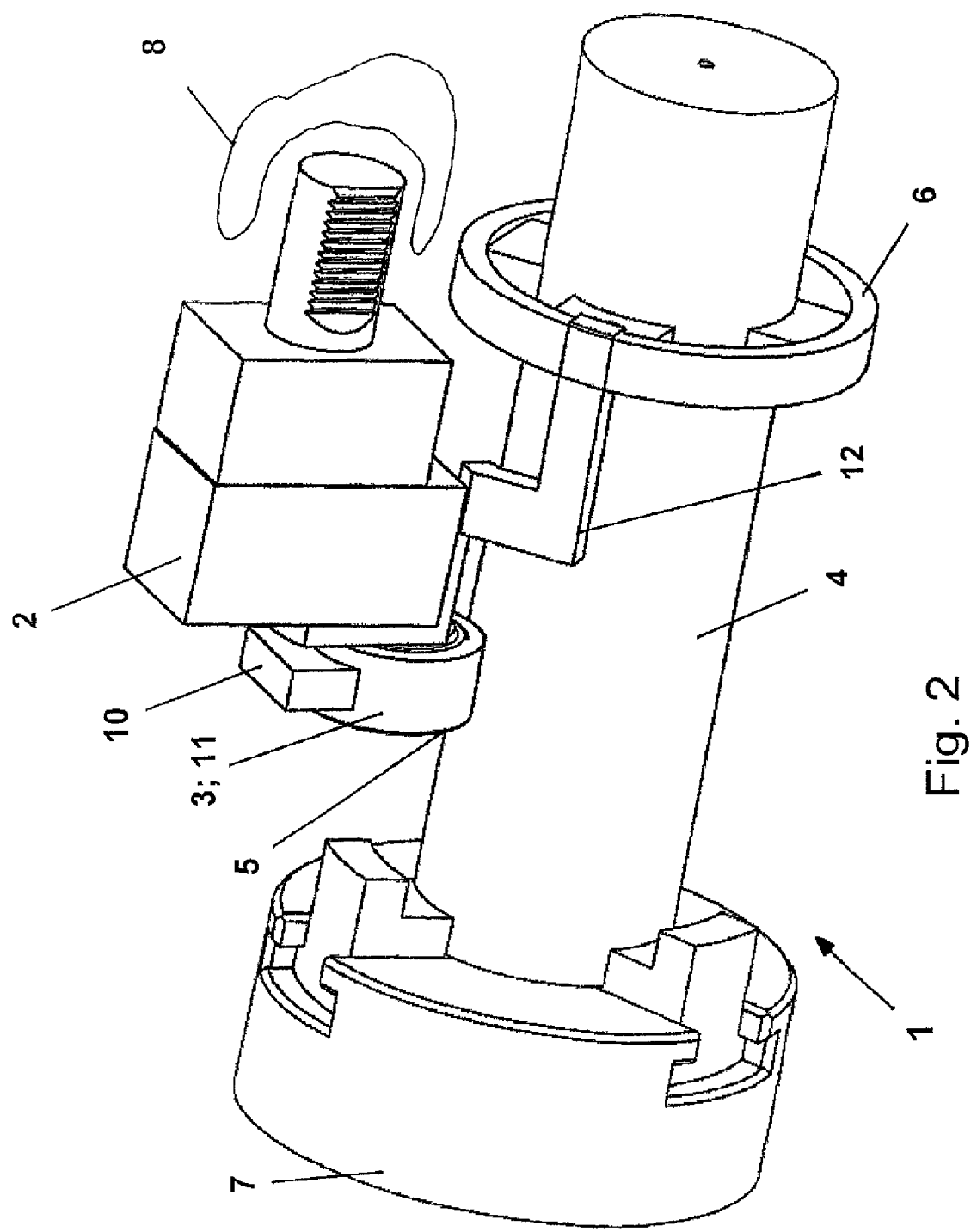
FIG. 2 a further embodiment of an EMRB device according to the invention, with which the second electrical contact element is designed differently than according to FIG. 1, as well as FIG. 3 a further embodiment of an EMRB device according to the invention.

FIGS. 2 and 3 show a slightly modified embodiment of the device according to FIG. 1 (the "second receiver 8" is represented only in a schematic manner in the FIGS. 2 and 3). That which has been described with regard to FIG. 1 also applies here, inasmuch as the differences are not explicitly dealt with hereinafter.

The main difference with FIG. 2 compared to FIG. 1 is the fact that the shape of the second electrical contact element 6 is slightly modified. Here, an essentially annular holder is provided on the dog 12, within which holder a large-surfaced, second electrical contact element or also several of this are provided in a distributed manner on the periphery. The advantage of a self-centring contact element subassembly results with the represented peripheral arrangement of several contact elements and their contact surfaces which are positioned in a resiliently yielding manner to the workpiece, by which means a uniform surface pressure between the contact elements and the workpiece is ensured. Here however, the distance between the first electrical contact element 5 and the second electrical contact element 6 remains constant in the longitudinal direction of the workpiece 4, during the complete machining procedure. In this case, the task of the dog is reduced mainly to realising the axial positioning and catching of the contact elements.

FIG. 3 shows a further embodiment, with which the roller burnishing tool 2 however comprises two current transmission elements 10, which in each case are pressed with spring holders 9 onto the roller burnishing element 3 or onto the roller 11. Moreover, the second electrical contact element is not fastened directly on the roller burnishing tool 2, but on an arm 13 which is independent of this. In turn, the second electrical contact element is attached in this arm 13 in a spring-mounted manner, wherein this second electrical contact element can consist of one or more constituents, which engage on the periphery of the workpiece 4. The arm 13 comprises a drive which is not described in more detail, for the feed in the axial workpiece direction parallel to the roller burnishing tool (see arrow in FIG. 3 next to the arm 13). The feed speed of the arm 13 preferably corresponds to the feed speed of the roller burnishing tool 2, but one could also envisage this feed speed being changed in a targeted manner, in order to deliberately influence the EMRB procedure. This for example would be conceivable with diameter variations such as cones, curved turned part contours in the longitudinal direction and likewise. Different current path lengths could be compensated by way of the separately controllable drive of the arm, and a constant power in the machining zone ensured.

LIST OF REFERENCE NUMERALS 1 device for the electromagnetically supported roller burnishing
2 roller burnishing tool
3 roller burnishing element
4 workpiece
5 first electrical contact element
6 second electrical contact element
7 first receiver (for workpiece)
8 second receiver (for lathe tool)
9 spring holder
10 current transmission element
11 roller
12 dog
13 arm

The invention claimed is:

1. A device for electromechanically assisted roller burnishing (EMRB) comprising:
a roller burnishing tool with exactly one current-leading roller burnishing element for burnishing a workpiece, wherein the roller burnishing element represents a first electrical contact element for electrically contacting a first location of the workpiece, and a second electrical contact element for electrically contacting a second location of the workpiece;
wherein the first and the second electrical contact elements can be positioned at a settable spatial distance to one another, so that on moving the roller burnishing element on the workpiece, a current path in the workpiece between the first and the second contact elements is always a constant length.

2. The device according to claim 1, wherein the roller burnishing tool is designed for burnishing planar surfaces, free-shaped surfaces and/or round surfaces, wherein these round surfaces belong to workpieces which in cross section are essentially rotationally symmetrical or oval.

3. The device according to claim 1, wherein the device is a machine tool.

4. The device according to claim 3, wherein the device comprises a first receiver for a workpiece and/or a second receiver for a machining tool.

5. The device according to claim 1, wherein the first and/or the second electrical contact element comprises a yielding holder with a positioning element for the resilient holding of the contact element on the workpiece and/or wherein the second electrical contact element is designed as a roller, brush or component with a recess which is adapted to the outer contour of the workpiece.

6. The device according to claim 1,
wherein the first electrical contact element includes the roller burnishing element itself, and
wherein the roller burnishing element comprises a roller or a disk, and a current transmission element in the form of one or more brushes and/or one or more components with a recess complementary to the roller contacts the peripheral surface of the roller.

7. The device according to claim 1, wherein the second electrical contact element is arranged on a dog of the roller burnishing tool or on a co-led arm of the device.

8. The device according to claim 1,
wherein the device comprises a control and regulation device between the first and the second electrical contact elements for the closed-loop control of the voltage and the current strength of the current path which runs through the workpiece, and
wherein the control and regulation device comprises a measurement device for measuring the temperature of the workpiece surface.

9. The device according to claim 1,
wherein the roller burnishing tool is designed for clamping into a lathe tool receiver of a lathe, or of a lathe centre or milling centre,
wherein this roller burnishing tool comprises exactly one roller burnishing element for burnishing a workpiece, and the roller burnishing element comprises a first electrical contact element for the electrical contacting of the workpiece as well as a second electrical contact element for electrically contacting the workpiece,
wherein the first and the second electrical contact elements are positionable at a settable, spatial distance to one another, so that a current path in the workpiece between the first and the second electrical elements is always a constant length on moving the roller burnishing element on the workpiece,
wherein the roller burnishing tool between the first and the second electrical contact element further comprises a control and regulation device for the closed-loop control of the voltage and current strength of the current path which runs through the workpiece, and
wherein the control and regulation device comprises a measurement device for measuring the temperature of the workpiece surface.

10. A method for roller burnishing surfaces of a workpiece, comprising:
providing the roller burnishing tool of claim 1;
using the tool to roller burnish a workpiece by moving the roller burnishing element on the workpiece surface and leading the second electrical contact element in a manner such that a current path through the workpiece between the first and the second contact element remains a constant length.

* * * * *